(12) United States Patent
Yamakage

(10) Patent No.: US 6,879,548 B2
(45) Date of Patent: Apr. 12, 2005

(54) OPTICAL RECORDING MEDIUM AND PRODUCTION METHOD THEREFOR

(75) Inventor: Yuzuru Yamakage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 567 days.

(21) Appl. No.: 10/103,591

(22) Filed: Mar. 21, 2002

(65) Prior Publication Data

US 2002/0167871 A1 Nov. 14, 2002

(30) Foreign Application Priority Data

Nov. 5, 2001 (JP) ........................................ 2001-339693

(51) Int. Cl.[7] .............................................. G11B 11/00
(52) U.S. Cl. .................. 369/13.38; 369/13.4; 369/286; 428/64.4; 430/270.11
(58) Field of Search .......................... 369/13.35, 13.38, 369/13.39, 13.4, 13.41, 13.42, 283, 286, 288; 428/64.4, 65.3; 430/270.1, 270.11, 320, 321, 331, 495.1

(56) References Cited

U.S. PATENT DOCUMENTS

| 5,623,458 | A | | 4/1997 | Matsumoto et al. ........... 369/13 |
| 5,723,227 | A | | 3/1998 | Matsumoto et al. ........ 428/694 |
| 6,638,597 | B1 | * | 10/2003 | Shinoda et al. ............. 428/141 |
| 6,677,104 | B1 | * | 1/2004 | Mizushima et al. ... 430/270.13 |
| 6,697,323 | B1 | * | 2/2004 | Miki ....................... 369/275.1 |

FOREIGN PATENT DOCUMENTS

| JP | 10-320859 | 12/1998 |
| JP | 2000-306271 | 11/2000 |

* cited by examiner

Primary Examiner—Paul W. Huber
(74) Attorney, Agent, or Firm—Greer, Burns & Crain, Ltd.

(57) ABSTRACT

An optical recording medium is provided which has a reflective film, a lower dielectric film, a recording film and an upper dielectric film stacked in this order on a substrate, and is adapted to receive light from the side of the upper dielectric film and reproduce a signal by utilizing at least reflected light from the recording film. The optical recording medium is characterized in that a surface of the recording film at an interface with the upper dielectric film has a surface roughness of not greater than 4 Å.

4 Claims, 4 Drawing Sheets

FIG. 3

|  | Example 1 | Example 2 | Comparative Example 1 | Comparative Example 2 |
|---|---|---|---|---|
| Surface roughness | 3.5Å | 4.0Å | 4.5Å | 5.0Å |
| Noise level at 25 MHz | -77.3dBm | -77.3dBm | -77.1dBm | -77.0dBm |
| Total noise in range of 0 to 80MHz | 5.0mVrms | 5.1mVrms | 5.5mVrms | 5.9mVrms |

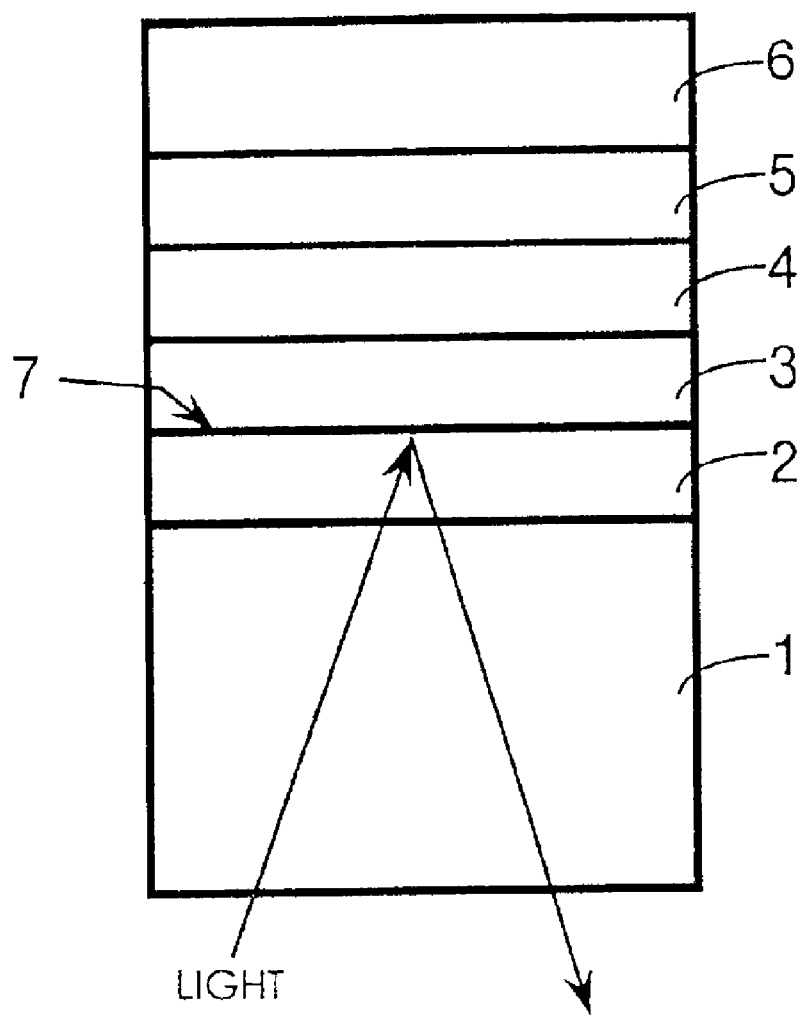

OPTICAL RECORDING MEDIUM AND PRODUCTION METHOD THEREFOR

CROSS-REFERENCE TO RELATED APPLICATION

This application is related to Japanese application No. 2001-339693 filed on Nov. 5, 2001 whose priority is claimed under 35 USC §119, the disclosure of which is incorporated by reference in its entirety.

BACKGROUND OF THE INVENTION

1. Field of the Invention

The present invention relates to an optical recording medium and, more particularly, to an optical recording medium which is adapted to record and reproduce information by application of a laser beam, wherein a constituent film thereof serving for light reflection has a smoothed surface for a higher recording density.

2. Description of the Related Art

To increase the recording density of an optical disk, the size of recording marks is minimized, for example, by employing an objective lens having a higher numerical aperture (NA).

The optical disk generally has a laminate structure including a substrate, a recording layer, a reflective film and a protective film. Where an optical lens having a high NA is employed to increase the recording density, the recording and reproducing accuracy tends to be reduced due to an increased aberration caused by variations in the thickness of the substrate and the tilt of the substrate. One conceivable approach to this problem is to cause a laser beam to be incident from the side of the protective film for the recording and reproduction. This recording and reproducing type is called "first surface recording (FSR) type" or "front illumination type".

A commercially available conventional optical disk includes an optical disk substrate 1, and a lower dielectric film 2, a recording film 3, an upper dielectric film 4, a reflective film 5 and a protective film 6 stacked in this order on the substrate 1 as shown in FIG. 4. A light beam is incident from the side of the optical disk substrate 1.

Where the recording film is an exchange-coupled magnetic super-resolution medium of a three-layer structure (U.S. Pat. No. 5,623,458, U.S. Pat. No. 5,723,227), the lower dielectric film 2, a reproducing layer, an intermediate layer and a recording layer of the recording film 3, the upper dielectric film 4, the reflective film 5 and the protective film 6 are stacked in this order on the optical disk substrate 1.

On the other hand, an optical disk of the FSR type includes an optical disk substrate 1, and a reflective film 5, a lower dielectric film 2, a recording film 3, an upper dielectric film 4 and a protective film 6 stacked in this order on the substrate 1 as shown in FIG. 1. A light beam is incident from the side of the protective film 6.

Where the recording film 3 is an exchange-coupled magnetic super-resolution medium of a three-layer structure, the reflective film 5, the lower dielectric film 2, a recording layer 33, an intermediate layer 32, a reproducing layer 31, the upper dielectric film 4 and the protective film 6 are stacked in this order on the optical disk substrate 1 as shown in FIG. 2. The recording layer 33, the intermediate layer 32 and the reproducing layer 31 constitute the recording film 3.

The optical disk of the FSR type ensures a higher recording density. However, the recording film of the optical disk tends to have a rough surface as compared with the conventional optical disk, because the surface of the recording film is liable to be influenced by the surface state of the reflective film underlying the recording film thereby to have greater undulations thereon.

The surface roughness increases random reflection of the light to increase noise, resulting in reduction in CNR (carrier-to-noise ratio) and SNR (signal-to-noise ratio).

Particularly in a high NA optical system, the CNR and the SNR are remarkably reduced with a remarkable noise increase, though the amplitude of a reproduction signal is not changed. This increases reproduction errors.

Japanese Unexamined Patent Publication No. 2000-306271 proposes a method for producing an optical recording medium, which ensures reduction in disk noise. In this method, a reflective film 5 is formed on a surface of an optical disk substrate and subjected to a surface smoothing process by sputter-etching, and a lower dielectric film 2 and a recording film 3 are formed on the reflective film 5.

Where the recording film is thin on the order of 10 nm, an incident light beam passes through the recording film and is reflected on the reflective film.

Where the recording film 3 of the optical disk has a thickness greater than about 40 nm, however, the laser beam does not pass through the recording film. Accordingly, the laser beam is hardly reflected on the reflective film 5, but mostly reflected on the surface of the recording film 3.

Even if the reflective film 5 and the lower dielectric film 2 underlying the recording film 3 each have a smooth surface, the recording film 3 having a rough surface randomly disturbs the polarization plane of the light beam reflected on the surface thereof, so that greater noise occurs in detected light.

In the case of the magnetic super-resolution medium, the recording film 3 of the three-layer structure is stacked on the lower dielectric film 2. Even if the reflective film and the dielectric film underlying the recording film 3 each have a relatively smooth surface, the surface roughness is increased as the films are stacked one on another. As a result, the reproducing layer on which the light beam is reflected has a greater surface roughness than the underlying films.

The noise of interest is attributable to the surface roughness of a light reflection surface, so that the surface roughness of the reflection surface needs to be reduced.

In the case of the conventional optical disk medium shown in FIG. 4, a reflection surface 7 is defined between the lower dielectric film 2 and the recording film 3. Therefore, the noise can be reduced by smoothing the surface of the lower dielectric film 2. In the case of the optical disk of the FSR type, on the contrary, a reflection surface 7 is defined between the recording film 3 and the upper dielectric film 4. Even if the underlying lower dielectric film 2 is smoothed, the noise reduction cannot be achieved without smoothing the surface of the recording film 3 (or the reproduction layer 31) which serves as the reflection surface.

SUMMARY OF THE INVENTION

The present invention is directed to an optical recording medium which is adapted to record and reproduce information by causing a light beam to be incident from the side of a protective film thereof opposite from a substrate thereof, wherein a surface of a recording film thereof serving as an incident light reflection surface has a reduced surface roughness so that noise reduction is ensured for improvement of the CNR and the SNR, and to a production method for such an optical recording medium.

In accordance with a first aspect of the present invention, there is provided an optical recording medium comprising a reflective film, a lower dielectric film, a recording film and an upper dielectric film stacked in this order on a substrate, wherein the optical recording medium is adapted so that light is incident from the side of the upper dielectric film and a signal is reproduced by utilizing at least reflected light from the recording film, and a surface of the recording film at an interface with the upper dielectric film has a surface roughness of not greater than 4 Å.

With this arrangement, a noise component contained in a reproduction signal obtained from the reflected light can be reduced, whereby an error in reading information to be reproduced can be reduced for improvement in signal quality.

In accordance with a second aspect of the present invention, there is provided a method for producing an optical recording medium comprising the steps of: forming a reflective film, a lower dielectric film and a recording film on a substrate by sputtering; etching a surface of the recording film so that the surface of the recording film has a surface roughness of not greater than 4 Å; and forming an upper dielectric film on the recording film by sputtering.

BRIEF DESCRIPTION OF THE DRAWINGS

FIG. 3 is an explanatory diagram for a comparison of noises occurring in optical recording media which respectively include recording films having different surface roughness levels; and FIG. 4 is a sectional view of a conventional optical recording medium.

DETAILED DESCRIPTION OF THE INVENTION

Figure 1:
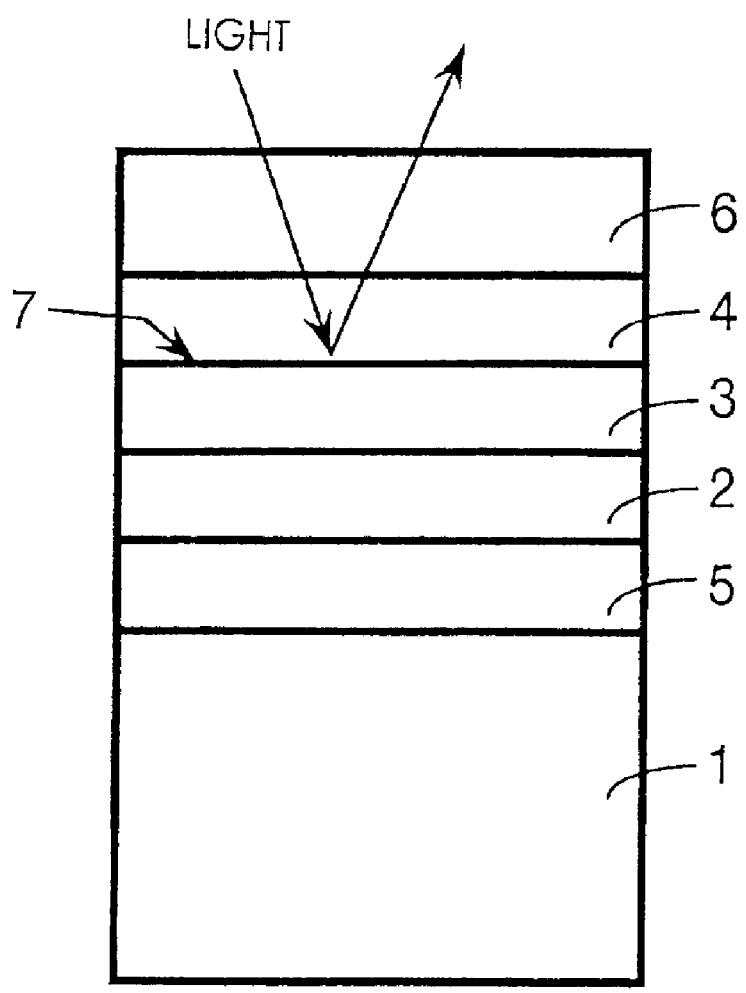
FIG. 1 is a sectional view of an optical recording medium according to the present invention.

An optical recording medium according to the present invention comprises a reflective film, a lower dielectric film, a recording film and an upper dielectric film stacked in this order on a substrate, and is adapted for reproduction of a signal by utilizing a light beam incident from the side of the upper dielectric film and reflected on the recording film, wherein a surface of the recording film at an interface with the upper dielectric film has a surface roughness of not greater than 4 Å.

With this arrangement, a noise component contained in a reproduction signal obtained from the reflected light can be reduced, whereby an error in reading information to be reproduced can be reduced for improvement in signal quality. The surface roughness is herein defined as a physical value (Å) determined in conformity with JIS B0601.

Where the recording film comprises a magnetic super-resolution film of a three-layer structure including a recording layer, an intermediate layer and a reproducing layer stacked in this order on the lower dielectric film, a surface of the reproducing layer at an interface with the upper dielectric film has a surface roughness of not greater than 4 Å.

For reflection of most of the incident light on the interface, the recording film preferably has the greatest possible thickness. Provided that the incident light has a wavelength of 680 nm, the recording film needs to have a thickness of not smaller than 40 nm for reflection of not lower than 90% of the light on the interface.

For formation of the recording film having a surface roughness of not greater than 4 Å, the recording film is formed by sputtering, and then etched by a predetermined thickness with the use of an inert gas by an ordinary etching method.

The magnetic super-resolution film is a recording film including, for example, three magnetic layers (the recording layer, the intermediate layer and the reproducing layer in the present invention). Information stored in a portion of the recording layer of the recording film heated at a high temperature by application of the light beam is transferred to the reproducing layer via the intermediate layer, whereby a recording mark smaller than the diameter of a light spot is reproduced.

A method for producing an optical recording medium according to the present invention comprises the steps of: forming a reflective film on a substrate by sputtering; forming a lower dielectric film on the reflective film by sputtering; forming a recording film on the lower dielectric film by sputtering; etching a surface of the recording film so that the surface of the recording film has a surface roughness of not greater than 4 Å; and forming an upper dielectric film on the recording film by sputtering.

Not only the surface of the recording film but also surfaces of the reflective film and the lower dielectric film may be etched for smoothing thereof immediately after the formation of the respective films. That is, the film forming steps each comprise two steps, i.e., a sputtering step for film formation and an etching step for film smoothing.

The recording film is formed by forming a recording layer, an intermediate layer and a reproducing layer in this order on the lower dielectric film, and at least a surface of the reproducing layer is etched after the formation of the reproducing layer so that the surface of the reproducing layer has a surface roughness of not greater than 4 Å.

With reference to the attached drawings, the present invention will hereinafter be described by way of an embodiment thereof It should be understood that the invention be not limited to the embodiment.

An explanation will be given to an optical disk of an exchange-coupled magnetic super-resolution type which includes a recording film of a three-layer structure, and to a production method therefor in accordance with this embodiment. An optical disk including a recording film of a single-layer structure can also be produced by the production method to be described below, and provides a satisfactory noise reduction effect.

Figure 2:
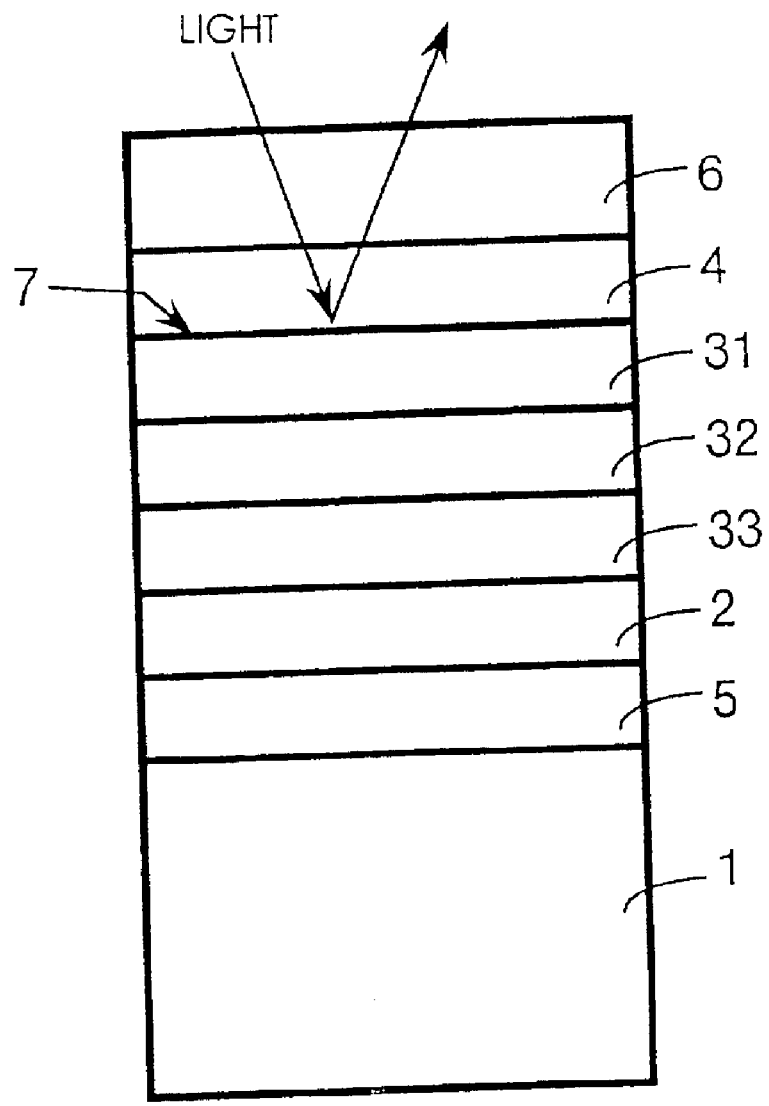
FIG. 2 is a sectional view of an optical recording medium having a recording film of a magnetic super-resolution type in accordance with the present invention.

The optical disk according to the present invention is of the FSR type in which a light beam is incident from a side opposite from a substrate of the optical disk, and has the same construction as shown in FIG. 1. The optical disk of the magnetic super-resolution type according to this embodiment has the same construction as shown in FIG. 2.

(1) Preparation of Substrate

A resin optical substrate 1 is produced by injection molding. Exemplary materials for the substrate 1 include amorphous polyolefin resins and polycarbonate resins. The substrate 1 typically has a track pitch of 0.4 µm, a groove depth of 30 nm, and a thickness of 1.2 mm, but the track pitch, groove depth and thickness of the substrate are not limited thereto. Recording marks may be formed only in lands, only in grooves, or in both of the lands and the grooves.

The substrate 1 typically has a surface roughness of 2.5 Å as measured in conformity with JIS B0601. The surface roughness of each of the following layers of the optical disk is defined in the same manner. An atomic force microscope (AFM) is employed for the measurement of the surface roughness.

The respective films shown in FIG. 2 are formed on the surface of the substrate 1 in the following manner by sputtering. The substrate 1 is set in a predetermined position within an ordinary vacuum film forming apparatus (sputtering apparatus). The sputtering apparatus is initially evacuated at a vacuum degree of $5 \times 10^{-5}$ Pa, and kept at a pressure of about 0.5 Pa to about 1 Pa during film formation with a power supply of about 0.5 kW to about 0.8 kW.

(2) Formation of Reflective Film

A reflective film 5 is formed on the substrate 1. Aluminum (Al), for example, is used as a material for the reflective film 5. The reflective film 5 typically has a surface roughness of about 5 Å after the formation thereof. The reflective film 5 may be left as it is, but is preferably subjected to a surface smoothing process. Other usable materials for the reflective film 5 include silver, aluminum alloys and silver alloys which are high in reflectivity.

The surface of the reflective film 5 is etched with an RF strength of 1 kW for about 10 minutes by feeding argon gas at a flow rate of 60 sccm at a gas pressure of 0.5 Pa, so that the thickness of the reflective film 5 is reduced to about 15 nm.

After the etching, the reflective film 5 typically has a surface roughness of about 4 Å. Other usable etching gases include inert gases such as krypton.

(3) Formation of Lower Dielectric Film

A lower dielectric film 2 is formed on the reflective film 5. SiN is used as a material for the lower dielectric film 2. The surface of the lower dielectric film 2 is etched with an RF strength of 0.5 kW for five minutes by feeding a gas mixture containing argon gas and nitrogen gas in a ratio of 2:1 at a flow rate of 60 sccm at a gas pressure of 0.5 Pa for smoothing thereof.

After the etching, the lower dielectric film 2 typically has a thickness of about 60 nm and a surface roughness of about 4 Å.

(4) Formation of Recording Film

A recording film 3 of a three-layer structure as shown in FIG. 2 is formed on the lower dielectric film 2. The recording film is of an exchange-coupled double mask RAD magnetic super-resolution type. A TbFeCo alloy film (recording layer 33) is formed on the lower dielectric film (SiN) 2, and a GdFeCo alloy film (intermediate layer 32) is formed on the recording layer 33. Then, a GdFeCo alloy film (reproducing layer 31) is formed on the intermediate layer 32.

After the formation of each of these layers, the layers are subjected to a surface smoothing process by etching with the use of argon gas. After the etching, the recording layer 33, the intermediate layer 32 and the reproducing layer 31 typically have thicknesses of 50 nm, 40 nm and 40 nm, respectively. The etching is carried out under substantially the same conditions as employed for the etching of the lower dielectric film 2. The uppermost reproducing layer 31 typically has a surface roughness of about 3.5 Å after the formation and etching of the respective layers.

The surface of the reproducing layer 31, which is sufficiently smooth with a surface roughness of about 3.5 Å, serves as a light reflection surface of the optical disk according to this embodiment. Therefore, noise can sufficiently be reduced as will be described later.

(5) Formation of Upper Dielectric Film

An upper dielectric film 4 of SiN is formed on the reproducing layer 31. A gas mixture containing argon gas and nitrogen gas in a ratio of 2:1 is used for the film formation. Other conditions for the film formation are the same as those employed for the formation of the lower dielectric film 2. The upper dielectric film 4 typically has a thickness of about 80 nm.

The surface of the upper dielectric film 4 does not serve as the light reflection surface and, hence, has no influence on the noise. Therefore, there is no need to perform the surface smoothing process by etching.

(6) Formation of Protective Film

A UV-curable resin is deposited to a thickness of about 15 $\mu$m on the upper dielectric film 4 for formation of a protective film 6.

Where the optical disk is of a magnetic field modulation recording type, the protective film 6 needs to have a thickness of 15 $\mu$m±2 $\mu$m. Where the optical disk is of a light modulation recording type, the protective film 6 needs to have a thickness of about 10 $\mu$m to about 100 $\mu$m.

By thus performing the aforesaid steps, the optical disk of FIG. 2 is produced in accordance with the present invention.

Examples 1 and 2 and Comparative Examples 1 and 2

Optical disks having a construction as shown in FIG. 2 according to Examples 1 and 2 and Comparative Examples 1 and 2 were produced in substantially the same manner as described above. The etching periods for the reflective film 5, the lower dielectric film 2, the recording layer 33, the intermediate layer 32 and the reproducing layer 31 were variously set in the respective examples and comparative examples, so that the reproducing layer 31 had a surface roughness of 3.5 Å in Example 1, 4.0 Å in Example 2, 4.5 Å in Comparative Example 1, and 5.0 Å in Comparative Example 2.

An evaluation was made on noise occurring in each of the optical disks. An optical disk tester having a wavelength of 660 nm and an NA of 0.85 was used for the evaluation of the noise. As shown in FIG. 2, a light beam was applied from the side of the protective film 6 for recording a signal on a magnetic field modulation basis. The optical disk was scanned at a linear speed of 5 m/s for recording the signal and at a linear speed of 10 m/s for reproducing the signal, and a minimum recording mark length was 0.2 $\mu$m.

FIG. 3 shows a comparison of the noises occurring in the respective optical disks with the recording films thereof having different surface roughness levels. Noise levels shown in FIG. 3 are the results of measurement of noises occurring when a high density recording pattern including 0.2-$\mu$m marks and 0.2-$\mu$m spaces was reproduced.

When the high density recording pattern was reproduced with the optical disk being scanned at a linear speed of 10 m/s, a spectrum analyzer provided a wave form having a frequency of 25 MHz. From one aspect, a comparison was made between noise levels at 25 MHz. Conditions for the measurement with the spectrum analyzer were a resolution band width of 30 kHz and a video band width of 100 Hz.

As can be seen from FIG. 3, the noise level at 25 MHz was slightly lower in Examples 1 and 2 in which the surface roughness was 3.5 Å and 4.0 Å, respectively, but did not significantly vary in Examples 1 and 2 and Comparative Examples 1 and 2 with different surface roughness levels in the range of 3.5 Å to 5 Å.

FIG. 3 also shows a comparison of total noises (SNR) in the range of 0 MHz to 80 MHz.

The total noise was determined by filtering reproduced signals by a low pass filter having a cut-off frequency of 42.5

MHz, inputting the resulting signals to the spectrum analyzer, and integrating the noise in the range of 0 MHz to 80 MHz. Conditions for the measurement with the spectrum analyzer were the same as described above.

As can be seen from FIG. 3, the total noise was reduced as the surface roughness was reduced. In Comparative Examples 1 and 2 in which the surface roughness was 4.5 Å and 5.0 Å, respectively, the total noise was significantly great. That is, where the surface roughness was not greater than 4 Å, the total noise was significantly reduced. Where the surface roughness was greater than 4 Å, the total noise was significantly increased.

Though not shown, a main component of the noise (SNR) in the range of 0 MHz to 5 MHz was significantly reduced where the surface roughness was not greater than 4 Å.

It is generally known that the noise in the low frequency range (0 MHz to 5 MHz) causes fluctuation of a signal recording and reproducing system in a long cycle to aggravate jitter of the recording signals and increase a bit error rate. By reducing the surface roughness of the light reflection surface to not greater than 4 Å, the noise in the low frequency range significantly influencing the signal quality can substantially be suppressed, so that errors in reading information to be reproduced can be reduced.

Although the embodiment of the present invention described above is directed to the optical disk adapted to optically record and reproduce information in the magnetic super-resolution medium of the three-layer structure, the invention is applicable to a magneto-optical recording medium in which a recording film thereof has a greater thickness and a surface of the recording film at an interface with an upper dielectric film serves as a light reflection surface. In this case, also, the noise can be reduced by reducing the surface roughness of the light reflection surface to not greater than 4 Å.

In accordance with the present invention, the light reflection surface of the optical recording medium is smoothed so as to reduce the noise attributable to the surface roughness of the light reflection surface. Particularly in the optical recording medium of the FSR type adapted to record and reproduce information by causing the light beam to be incident from the side opposite from the substrate (e.g., the optical recording medium of the magnetic super-resolution type including the recording film of the multi-layer structure for recording and reproducing information with the use of the high NA optical system), the noise can be reduced to a level such that virtually no problem is posed in the reproduction of the information. Thus, the present invention provides an ultra-high density recording medium in which minute marks can be recorded.

What is claimed is:

1. An optical recording medium comprising a reflective film, a lower dielectric film, a recording film and an upper dielectric film stacked in this order on a substrate, wherein the optical recording medium is adapted so that light is incident from the side of the upper dielectric film and a signal is reproduced by utilizing at least reflected light from the recording film, and a surface of the recording film at an interface with the upper dielectric film has a surface roughness of not greater than 4 Å.

2. The optical recording medium according to claim 1, wherein the recording film comprises a magnetic super-resolution film of a three-layer structure including a recording layer, an intermediate layer and a reproducing layer stacked in this order on the lower dielectric film, and a surface of the reproducing layer at an interface with the upper dielectric film has a surface roughness of not greater than 4 Å.

3. A method for producing an optical recording medium comprising the steps of:

forming a reflective film, a lower dielectric film and a recording film in this order on a substrate by sputtering;

etching a surface of the recording film so that the surface of the recording film has a surface roughness of not greater than 4 Å; and forming an upper dielectric film on the recording film by sputtering.

4. The method according to claim 3, wherein the recording film is formed by forming a recording layer, an intermediate layer and a reproducing layer in this order on the lower dielectric film, and at least a surface of the reproducing layer is etched after the formation of the reproducing layer so that the surface of the reproducing layer has a surface roughness of not greater than 4 Å.

* * * * *